(12) United States Patent
Koseoglu

(10) Patent No.: US 9,920,265 B2
(45) Date of Patent: Mar. 20, 2018

(54) SELECTIVE SERIES-FLOW HYDROPROCESSING SYSTEM

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/400,310

(22) Filed: Jan. 6, 2017

(65) Prior Publication Data

US 2017/0114289 A1    Apr. 27, 2017

Related U.S. Application Data

(62) Division of application No. 13/559,958, filed on Jul. 27, 2012, now Pat. No. 9,556,388.

(60) Provisional application No. 61/513,225, filed on Jul. 29, 2011.

(51) Int. Cl.
| | |
|---|---|
| *C10G 65/14* | (2006.01) |
| *C10G 67/14* | (2006.01) |
| *B01J 8/04* | (2006.01) |

(52) U.S. Cl.
CPC .............. *C10G 67/14* (2013.01); *B01J 8/04* (2013.01); *B01J 2208/027* (2013.01); *C10G 2300/1096* (2013.01); *C10G 2300/202* (2013.01)

(58) Field of Classification Search
CPC ........ C10G 65/02; C10G 65/04; C10G 65/08; C10G 65/12; C10G 65/14; C10G 67/02; C10G 67/04; C10G 67/0418; C10G 67/0436; C10G 67/044; C10G 21/00
See application file for complete search history.

(56) References Cited

U.S. PATENT DOCUMENTS 3,642,611 A * 2/1972 Robertson .............. C10G 67/00
208/111.15

OTHER PUBLICATIONS

Don Green et al., Perry's Chemical Engineers' Handbook, Chapter 15 Liquid-Liquid Extraction and Other Liquid-Liquid Operations and Equipment, McGraw-Hill (2008).*

* cited by examiner

Primary Examiner — Randy Boyer
Assistant Examiner — Brandi M Doyle
(74) Attorney, Agent, or Firm — Abelman, Frayne & Schwab

(57) ABSTRACT

Aromatic extraction and hydrocracking processes are integrated to optimize the hydrocracking units design and/or performance. By processing aromatics-rich and aromatic-lean fractions separately, the hydrocracking operating severity and or catalyst reactor volume requirement decreases.

8 Claims, 7 Drawing Sheets

SELECTIVE SERIES-FLOW HYDROPROCESSING SYSTEM

RELATED APPLICATIONS

This application is a Divisional Application of U.S. application Ser. No. 13/559,958 filed on Jul. 27, 2012, which claims the benefit of U.S. Provisional Patent Application No. 61/513,225 filed Jul. 29, 2011, the disclosures of which are hereby incorporated by reference in their entireties.

BACKGROUND OF THE INVENTION

Field of the Invention

The present invention relates to hydroprocessing systems and methods, in particular for efficient reduction of catalyst-fouling aromatic nitrogen components in a hydrocarbon mixture.

Description of Related Art

Hydrocracking operations are used commercially in a large number of petroleum refineries. They are used to process a variety of feeds boiling in the range of 370° C. to 520° C. in conventional hydrocracking units and boiling at 520° C. and above in the residue hydrocracking units. In general, hydrocracking processes split the molecules of the feed into smaller, i.e., lighter, molecules having higher average volatility and economic value. Additionally, hydrocracking typically improves the quality of the hydrocarbon feedstock by increasing the hydrogen to carbon ratio and by removing organosulfur and organonitrogen compounds. The significant economic benefit derived from hydrocracking operations has resulted in substantial development of process improvements and more active catalysts.

Mild hydrocracking or single stage hydrocracking operations, typically the simplest of the known hydrocracking configurations, occur at operating conditions that are more severe than typical hydrotreating, and less severe than typical full pressure hydrocracking. Single or multiple catalysts systems can be used depending upon the feedstock and product specifications. Multiple catalyst systems can be deployed as a stacked-bed configuration or in multiple reactors. Mild hydrocracking operations are generally more cost effective, but typically result in both a lower yield and reduced quality of mid-distillate product as compared to full pressure hydrocracking operations.

In a series-flow configuration the entire hydrocracked product stream from the first reaction zone, including light gases (e.g., $C_1$-$C_4$, $H_2S$, $NH_3$) and all remaining hydrocarbons, are sent to the second reaction zone. In two-stage configurations the feedstock is refined by passing it over a hydrotreating catalyst bed in the first reaction zone. The effluents are passed to a fractionating zone column to separate the light gases, naphtha and diesel products boiling in the temperature range of 36° C. to 370° C. The hydrocarbons boiling above 370° C. are then passed to the second reaction zone for additional cracking.

Conventionally, most hydrocracking processes that are implemented for production of middle distillates and other valuable fractions retain aromatics, e.g., boiling in the range of about 180° C. to 370° C. Aromatics boiling higher than the middle distillate range are also included and produced in the heavier fractions.

In all of the above-described hydrocracking process configurations, cracked products, along with partially cracked and unconverted hydrocarbons, are passed to a distillation column for separating into products including naphtha, jet fuel/kerosene and diesel boiling in the nominal ranges of 36° C.-180° C., 180° C.-240° C. and 240° C.-370° C., respectively, and unconverted products boiling in the nominal range of above 370° C. Typical jet fuel/kerosene fractions (i.e., smoke point >25 mm) and diesel fractions (i.e., cetane number >52) are of high quality and well above the worldwide transportation fuel specifications. Although the hydrocracking unit products have relatively low aromaticity, aromatics that do remain lower the key indicative properties (smoke point and cetane number) for these products.

A need remains in the industry for improvements in operations for heavy hydrocarbon feedstocks to produce clean transportation fuels in an economical and efficacious manner.

SUMMARY OF THE INVENTION

In accordance with one or more embodiments, the invention relates to systems and methods of hydrocracking heavy hydrocarbon feedstocks to produce clean transportation fuels. An integrated hydrocracking process includes hydroprocessing an aromatic-rich fraction of the initial feed separately from an aromatic-lean fraction.

In a series-flow hydrocracker configuration provided herein, an aromatic separation unit is integrated in which:

the feedstock is separated into an aromatic-rich fraction and an aromatic-lean fraction;

the aromatic-rich fraction is passed to a first vessel of a first stage hydroprocessing reaction zone operating under conditions effective to hydrotreat and/or hydrocrack at least a portion of aromatic compounds contained in the aromatic-rich fraction and to produce a first vessel first stage hydroprocessing reaction zone effluent;

the aromatic-lean fraction is passed to a second vessel of the first stage hydroprocessing reaction zone operating under conditions effective to hydrotreat and/or hydrocrack at least a portion of paraffin and naphthene compounds contained in the aromatic-lean fraction and to produce a second vessel first stage hydroprocessing reaction zone effluent;

a mixture of the first vessel first stage hydroprocessing reaction zone effluent and the second vessel first stage hydroprocessing reaction zone effluent is passed to a second stage hydroprocessing reaction zone to produce a second stage hydroprocessing reaction zone effluent; and the second stage hydroprocessing reaction zone effluent is fractionated in a fractionating zone to produce a product stream and a bottoms stream that are separately recovered.

Unlike typical known methods, the present process separates the hydrocracking feed into fractions containing different classes of compounds with different reactivities relative to the conditions of hydrocracking. Conventionally, most approaches subject the entire feedstock to the same hydroprocessing reaction zones, necessitating operating conditions that must accommodate feed constituents that require increased severity for conversion, or alternatively sacrifice overall yield to attain desirable process economics.

Since aromatic extraction operations typically do not provide sharp cut-offs between the aromatics and non-aromatics, the aromatic-lean fraction contains a major proportion of the non-aromatic content of the initial feed and a minor proportion of the aromatic content of the initial feed, and the aromatic-rich fraction contains a major proportion of the aromatic content of the initial feed and a minor proportion of the non-aromatic content of the initial feed. The amount of non-aromatics in the aromatic-rich fraction, and the amount of aromatics in the aromatic-lean fraction, depend on various factors as will be apparent to one of ordinary skill in the art, including the type of extraction, the number of theoretical plates in the extractor (if applicable to the type of extraction), the type of solvent and the solvent ratio.

The feed portion that is extracted into the aromatic-rich fraction includes aromatic compounds that contain heteroatoms and those that are free of heteroatoms. Aromatic compounds that contain heteroatoms that are extracted into the aromatic-rich fraction generally include aromatic nitrogen compounds such as pyrrole, quinoline, acridine, carbazoles and their derivatives, and aromatic sulfur compounds such as thiophene, benzothiophenes and their derivatives, and dibenzothiophenes and their derivatives. These nitrogen- and sulfur-containing aromatic compounds are targeted in the aromatic separation step(s) generally by their solubility in the extraction solvent. In certain embodiments, selectivity of the nitrogen- and sulfur-containing aromatic compounds is enhanced by use of additional stages and/or selective sorbents. Various non-aromatic sulfur-containing compounds that may have been present in the initial feed, i.e., prior to hydrotreating, include mercaptans, sulfides and disulfides. Depending on the aromatic extraction operation type and/or condition, a preferably very minor portion of non-aromatic nitrogen- and sulfur-containing compounds can pass to the aromatic-rich fraction.

As used herein, the term "major proportion of the non-aromatic compounds" means at least greater than 50 weight % (W %)W % of the non-aromatic content of the feed to the extraction zone, in certain embodiments at least greater than about 85 W %, and in further embodiments greater than at least about 95 W %. Also as used herein, the term "minor proportion of the non-aromatic compounds" means no more than 50 W % of the non-aromatic content of the feed to the extraction zone, in certain embodiments no more than about 15 W %, and in further embodiments no more than about 5 W %.

Also as used herein, the term "major proportion of the aromatic compounds" means at least greater than 50 W % of the aromatic content of the feed to the extraction zone, in certain embodiments at least greater than about 85 W %, and in further embodiments greater than at least about 95 W %. Also as used herein, the term "minor proportion of the aromatic compounds" means no more than 50 W % of the aromatic content of the feed to the extraction zone, in certain embodiments no more than about 15 W %, and in further embodiments no more than about 5 W %.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The foregoing summary as well as the following detailed description will be best understood when read in conjunction with the attached drawings. It should be understood, however, that the invention is not limited to the precise arrangements and apparatus shown. In the drawings the same or similar reference numerals are used to identify to the same or similar elements, in which.

DETAILED DESCRIPTION OF THE INVENTION

An integrated system is provided for efficient hydroprocessing of heavy hydrocarbon feedstocks to produce clean transportation fuels. In general, the process and apparatus described herein for producing cracked hydrocarbons are applied to series-flow hydrocracking configurations.

An aromatic separation unit is integrated in a series-flow hydrocracker configuration as follows:

a feedstock is separated into an aromatic-rich fraction and an aromatic-lean fraction;

the aromatic-rich fraction is passed to a first vessel of a first stage hydroprocessing reaction zone operating under conditions effective to hydrotreat and/or hydrocrack at least a portion of aromatic compounds contained in the aromatic-rich fraction and to produce a first vessel first stage hydroprocesing reaction zone effluent;

the aromatic-lean fraction is passed to a second vessel of the first stage hydroprocessing reaction zone operating under conditions effective to hydrotreat and/or hydrocrack at least a portion of paraffin and naphthene compounds contained in the aromatic-lean fraction and to produce a second vessel first stage hydroprocessing reaction zone effluent;

a mixture of first vessel first stage hydroprocessing reaction zone effluent and second vessel first stage hydroprocessing reaction zone effluent is passed to a second stage hydroproces sing reaction zone to produce a second stage hydroproces sing reaction zone effluent; and the second stage hydroprocessing reaction zone effluent is fractionated in a fractionating zone to produce one or more product streams and one or more bottoms streams that can be separately recovered.

Figure 1:
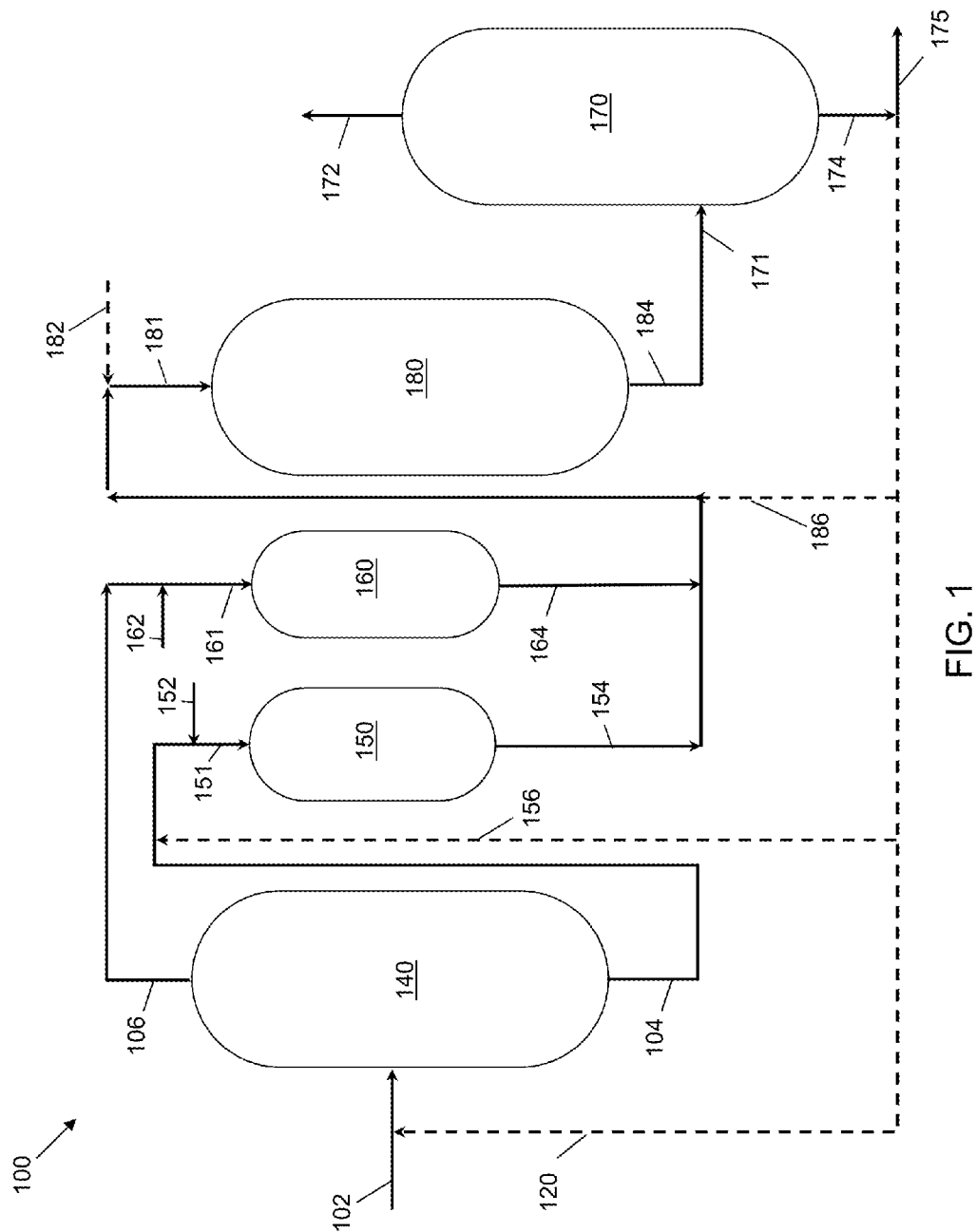
FIG. 1 is a process flow diagram of a hydroprocessing system operating in a series-flow configuration.

FIG. 1 is a process flow diagram of an integrated hydrocracking apparatus 100 in the configuration of a series-flow hydrocracking unit apparatus. Apparatus 100 includes an aromatic extraction zone 140, a first vessel 150 of a first stage hydroprocessing reaction zone containing a first vessel first stage hydroprocessing catalyst, a second vessel 160 of the first stage hydroprocessing reaction zone containing a second vessel first stage hydroprocessing catalyst, a second stage hydroprocessing reaction zone 180 containing a second stage hydroprocessing catalyst and a fractionating zone 170.

Aromatic extraction zone 140 typically includes a feed inlet 102, an aromatic-rich stream outlet 104 and an aromatic-lean stream outlet 106. In certain embodiments, feed inlet 102 is in fluid communication with fractionating zone 170 via an optional recycle conduit 120 to receive all or a portion of the bottoms 174. Various embodiments and unit-operations contained within aromatic separation zone 140 are described in conjunction with FIGS. 2-8.

First vessel 150 generally includes an inlet 151 in fluid communication with aromatic-rich stream outlet 104 and a source of hydrogen gas via a conduit 152. First vessel 150 of the first stage hydroproces sing reaction zone also includes a first vessel first stage hydroprocessing reaction zone effluent outlet 154. In certain embodiments, inlet 151 is in fluid communication with fractionating zone 170 via an optional recycle conduit 156 to receive all or a portion of the bottoms 174.

First vessel 150 of first stage hydroprocessing reaction zone is operated under severe conditions. As used herein, "severe conditions" are relative and the ranges of operating conditions depend on the feedstock being processed. In certain embodiments of the process described herein, these conditions include a reaction temperature in the range of from about 300° C. to 500° C., in certain embodiments from about 380° C. to 450° C.; a reaction pressure in the range of from about 100 bars to 200 bars, in certain embodiments from about 130 bars to 180 bars; a hydrogen feed rate below about 2,500 standard liters per liter of hydrocarbon feed (SLt/Lt), in certain embodiments from about 500 to 2,500 SLt/Lt, and in further embodiments from about 1,000 to 1,500 SLt/Lt; and a feed rate in the range of from about 0.25 $h^{-1}$ to 3.0 $h^{-1}$, in certain embodiments from about 0.5 $h^{-1}$ to 1.0 $h^{-1}$.

The catalyst used in the first vessel of first stage hydroprocessing reaction zone has one or more active metal components selected from the Periodic Table of the Elements Group VI, VII or VIIIB. In certain embodiments the active metal component is one or more of cobalt, nickel, tungsten and molybdenum, typically deposited or otherwise incorporated on a support, e.g., alumina, silica alumina, silica, or zeolites.

Second vessel 160 of the first stage hydroprocessing reaction zone includes an inlet 161 in fluid communication with aromatic-lean stream outlet 106 and a source of hydrogen gas via a conduit 162. Second vessel 160 of the first stage hydroprocessing reaction zone also includes a second vessel first stage hydroprocessing reaction zone effluent outlet 164.

Second stage hydroprocessing reaction zone 180 includes an inlet 181 in fluid communication with first vessel first stage hydroprocessing reaction zone effluent outlet 154, second vessel first stage hydroprocessing reaction zone effluent outlet 164 and an optional source of hydrogen gas via a conduit 182. In certain embodiments, sufficient excess hydrogen can be included in the first stage hydroprocessing reaction zone vessels 150 and/or 160 so that hydrogen feed 182 can be minimized or obviated. Second stage hydroprocessing reaction zone 180 also includes a second stage hydroprocessing reaction zone effluent outlet 184. In certain embodiments, inlet 181 is in fluid communication with fractionating zone 170 via an optional recycle conduit 186 to receive all or a portion of the bottoms 174.

In general, the second vessel 160 of first stage hydroprocessing reaction zone and the second stage hydroprocessing reaction zone 180 are operated under mild conditions. As used herein, "mild conditions" are relative and the ranges of operating conditions depend on the feedstock being processed. In certain embodiments of the process described herein, these conditions include a reaction temperature in the range of from about 300° C. to 500° C., in certain embodiments from about 330° C. to 420° C.; a reaction pressure in the range of from about 30 bars to 130 bars, in certain embodiments from about 60 bars to 100 bars; a hydrogen feed rate below 2,500 SLt/Lt, in certain embodiments from about 500 to 2,500 SLt/Lt, and in further embodiments from about 1,000 to 1,500 SLt/Lt; and a feed rate in the range of from about 1.0 $h^{-1}$ to 5.0 $h^{-1}$, in certain embodiments from about 2.0 $h^{-1}$ to 3.0 $h^{-1}$.

The catalyst used in the second vessel of first stage hydroprocessing reaction zone and the second stage hydroprocessing reaction zone has one or more active metal components selected from the Periodic Table of the Elements Group VI, VII or VIIIB. In certain embodiments the active metal component is one or more of cobalt, nickel, tungsten and molybdenum, typically deposited or otherwise incorporated on a support, e.g., alumina, silica alumina, silica, or zeolites.

Fractionating zone 170 includes an inlet 171 in fluid communication with the second stage hydroprocessing reaction zone effluent outlet 184, a product stream outlet 172 and a bottoms stream outlet 174. Note that while one product outlet is shown, multiple product fractions can also be recovered from fractionating zone 170.

A feedstock is introduced via inlet 102 of the aromatic extraction zone 140 for extraction of an aromatic-rich fraction and an aromatic-lean fraction. Optionally, the feedstock can be combined with all or a portion of the bottoms 174 from the fractionating zone 170 via recycle conduit 120.

The aromatic-rich fraction generally includes a major proportion of the aromatic nitrogen- and sulfur-containing compounds that were in the initial feedstock and a minor proportion of non-aromatic compounds that were in the initial feedstock. Aromatic nitrogen-containing compounds that are extracted into the aromatic-rich fraction include pyrrole, quinoline, acridine, carbazole and their derivatives. Aromatic sulfur-containing compounds that are extracted into the aromatic-rich fraction include thiophene, benzothiophene and its long chain alkylated derivatives, and dibenzothiophene and its alkyl derivatives such as 4,6-dimethyldibenzothiophene. The aromatic-lean fraction generally includes a major proportion of the non-aromatic compounds that were in the initial feedstock and a minor proportion of the aromatic nitrogen- and sulfur-containing compounds that were in the initial feedstock. The aromatic-lean fraction is almost free of refractory nitrogen-containing compounds, and the aromatic-rich fraction contains nitrogen-containing aromatic compounds.

The aromatic-rich fraction discharged via outlet 104 is passed to inlet 151 of first vessel 150 of the first stage hydroprocessing reaction zone and mixed with hydrogen gas via conduit 152. Optionally, the aromatic-rich fraction is combined with all or a portion of the bottoms 174 from fractionating zone 170 via recycle conduit 156. Compounds contained in the aromatic-rich fraction including aromatics compounds are hydrotreated and/or hydrocracked. The first vessel 150 of the first stage hydroprocessing reaction zone is operated under relatively severe conditions. In certain embodiments, these relatively severe conditions of the first vessel 150 are more severe than conventionally known severe hydroprocessing conditions due to the comparatively higher concentration of aromatic nitrogen- and sulfur-containing compounds. However, the capital and operational costs of these more severe conditions are offset by the reduced volume of aromatic-rich feed that would be processed in the first vessel 150 as compared to a full range feed processed in a conventionally known severe hydroprocessing unit operation.

The aromatic-lean fraction discharged via outlet 106 is passed to inlet 161 of the second vessel 160 of the first stage hydroprocessing reaction zone and mixed with hydrogen gas via conduit 162. Compounds contained in the aromatic-lean fraction including paraffins and naphthenes are hydrotreated and/or hydrocracked.

The first vessel first stage hydroprocessing reaction zone effluent discharged via outlet 154 is mixed with the second vessel first stage hydroprocessing reaction zone effluent discharged via outlet 164 and passed to inlet 181 of the second stage hydroprocessing reaction zone 180. Compounds contained in the mixture of the first stage hydroprocessing reaction zone effluent and the aromatic-lean fraction, including paraffins and naphthenes, are hydrotreated and/or hydrocracked. Optionally, the mixture is combined with hydrogen gas via inlet 182 and recycled bottoms from the fractionating zone 170 via conduit 186. Note that the hydrogen source via inlet 182 can be obviated if there is no requirement for additional hydrogen, e.g., is provided via conduits 152 and 162 and passes unreacted to the second stage hydroprocessing reaction zone 180.

The second vessel 160 of the first stage hydroprocessing zone and the second stage hydroprocessing reaction zone 180 are operated under relatively mild conditions, which can be milder than the conventionally known mild hydroprocessing conditions due to the comparatively lower concentration of aromatic nitrogen- and sulfur-containing compounds thereby reducing capital and operational costs.

The second stage hydroproces sing reaction zone effluent is sent to one or more intermediate separator vessels (not shown) to remove gases including excess $H_2$, $H_2S$, $NH_3$, methane, ethane, propane and butanes. The liquid effluents are passed to inlet 171 of the fractionating zone 170 for recovery of liquid products via outlet 172, including, for instance, naphtha boiling in the nominal range of from about 36° C. to 180° C. and diesel boiling in the nominal range of from about 180° C. to 370° C. The bottoms stream discharged via outlet 174 includes unconverted hydrocarbons and/or partially cracked hydrocarbons, for instance, having a boiling temperature above about 370° C. It is to be understood that the product cut points between fractions are representative only and in practice cut points are selected based on design characteristics and considerations for a particular feedstock. For instance, the values of the cut points can vary by up to about 30° C. in the embodiments described herein. In addition, it is to be understood that while the integrated system is shown and described with one fractionating zone 170, in certain embodiments separate fractionating zones can be effective.

All or a portion of the bottoms can be purged via conduit 175, e.g., for processing in other unit operations or refineries. In certain embodiments to maximize yields and conversions a portion of bottoms 174 is recycled within the process to the aromatic separation unit 140, the first vessel 150 of the first stage hydroprocessing reaction zone and/or the second stage hydroprocessing reaction zone 180 (represented by dashed-lines 120, 156 and 186, respectively).

In addition, either or both of the aromatic-lean fraction and the aromatic-rich fraction also can include extraction solvent that remains from the aromatic extraction zone 140. In certain embodiments, extraction solvent can be recovered and recycled, e.g., as described with respect to FIG. 2.

Further, in certain embodiments aromatic compounds without heteroatoms (e.g., benzene, toluene and their derivatives) are passed to the aromatic-rich fraction and are hydrogenated and hydrocracked in the first vessel of the first stage, relatively more severe, hydrocracking zone to produce light distillates. The yield of these light distillates that meet the product specification derived from the aromatic compounds without heteroatoms is greater than the yield in conventional hydrocracking operations due to the focused and targeted hydrocracking zones.

In the above-described embodiment, the feedstock generally includes any liquid hydrocarbon feed conventionally suitable for hydrocracking operations, as is known to those of ordinary skill in the art. For instance, a typical hydrocracking feedstock is vacuum gas oil (VGO) boiling in the nominal range of from about 300° C. to 900° C. and in certain embodiments in the range of from about 370° C. to 520° C. De-metalized oil (DMO) or de-asphalted oil (DAO) can be blended with VGO or used as is. The hydrocarbon feedstocks can be derived from naturally occurring fossil fuels such as crude oil, shale oils, or coal liquids; or from intermediate refinery products or their distillation fractions such as naphtha, gas oil, coker liquids, fluid catalytic cracking cycle oils, residuals or combinations of any of the aforementioned sources. In general, aromatics content in VGO feedstock is in the range of from about 15 to 60 volume % (V %). The recycle stream can include 0 W % to about 80 W % of stream 174, in certain embodiments about 10 W % to 70 W % of stream 174 and in further embodiments about 20 W % to 60 W % of stream 174, for instance, based on conversions in each zone of between about 10 W % and 80 W %.

The aromatic separation apparatus is generally based on selective aromatic extraction. For instance, the aromatic separation apparatus can be a suitable solvent extraction aromatic separation apparatus capable of partitioning the feed into a generally aromatic-lean stream and a generally aromatic-rich stream. Systems including various established aromatic extraction processes and unit operations used in other stages of various refinery and other petroleum-related operations can be employed as the aromatic separation apparatus described herein. In certain existing processes, it is desirable to remove aromatics from the end product, e.g., lube oils and certain fuels, e.g., diesel fuel. In other processes, aromatics are extracted to produce aromatic-rich products, for instance, for use in various chemical processes and as an octane booster for gasoline.

Figure 2:
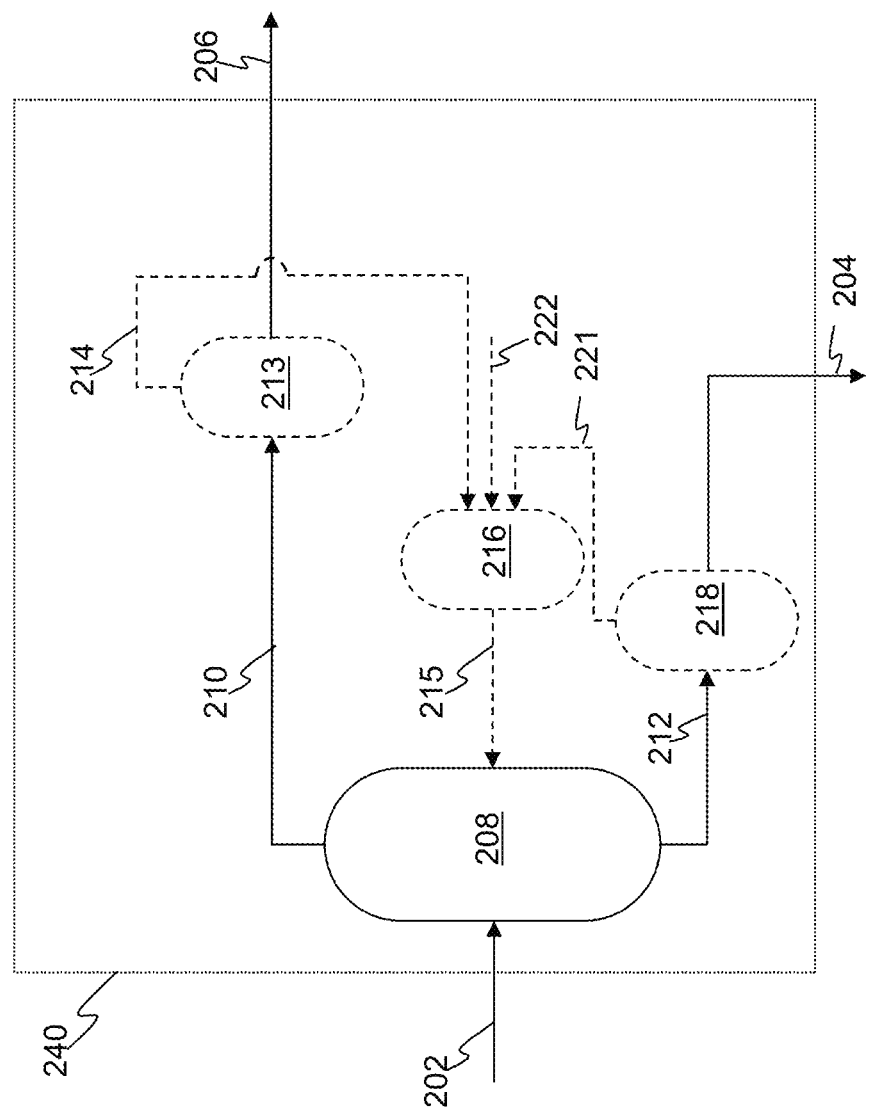
FIG. 2 is a schematic diagram of an aromatic separation apparatus.

As shown in FIG. 2, an aromatic separation apparatus 240 can include suitable unit operations to perform a solvent extraction of aromatics, and recover solvents for reuse in the process. A feed 202 is conveyed to an aromatic extraction vessel 208 in which in which a first, aromatic-lean, fraction is separated as a raffinate stream 210 from a second, generally aromatic-rich, fraction as an extract stream 212. A solvent feed 215 is introduced into the aromatic extraction vessel 208.

A portion of the extraction solvent can also exist in stream 210, e.g., in the range of about 0 W % to about 15 W % (based on the total amount of stream 210), in certain embodiments less than about 8 W %. In operations in which the solvent existing in stream 210 exceeds a desired or predetermined amount, solvent can be removed from the hydrocarbon product, for example, using a flashing or stripping unit 213, or other suitable apparatus. Solvent 214 from the flashing unit 213 can be recycled to the aromatic extraction vessel 208, e.g., via a surge drum 216. Initial solvent feed or make-up solvent can be introduced via stream 222. An aromatic-lean stream 206 is discharged from the flashing unit 213.

In addition, a portion of the extraction solvent can also exist in stream 212, e.g., in the range of about 70 W % to 98 W % (based on the total amount of stream 215), in certain embodiments less than about 85 W %. In embodiments in which solvent existing in stream 212 exceeds a desired or predetermined amount, solvent can be removed from the hydrocarbon product, for example, using a flashing or stripping unit 218 or other suitable apparatus. Solvent 221 from the flashing unit 218 can be recycled to the aromatic extraction vessel 208, e.g., via the surge drum 216. An aromatic-rich stream 204 is discharged from the flashing unit 218.

Selection of solvent, operating conditions, and the mechanism of contacting the solvent and feed permit control over the level of aromatic extraction. For instance, suitable solvents include furfural, N-methyl-2-pyrrolidone, dimethylformamide, dimethylsulfoxide, phenol, nitrobenzene, sulfolanes, acetonitrile, furfural, or glycols, and can be provided in a solvent to oil ratio of about 20:1, in certain embodiments about 4:1, and in further embodiments about 1:1. Suitable glycols include diethylene glycol, ethylene glycol, triethylene glycol, tetraethylene glycol and dipropylene glycol. The extraction solvent can be a pure glycol or a glycol diluted with from about 2 to 10 W % water. Suitable sulfolanes include hydrocarbon-substituted sulfolanes (e.g., 3-methyl sulfolane), hydroxy sulfolanes (e.g., 3-sulfolanol and 3-methyl-4-sulfolanol), sulfolanyl ethers (i.e., methyl-3-sulfolanyl ether), and sulfolanyl esters (e.g., 3-sulfolanyl acetate).

The aromatic separation apparatus can operate at a temperature in the range of from about 20° C. to 200° C., and in certain embodiments in the range of from about 40° C. to 80° C. The operating pressure of the aromatic separation apparatus can be in the range of from about 1 bar to 10 bars, and in certain embodiments in the range of about 1 bar to 3 bars. Types of apparatus useful as the aromatic separation apparatus in certain embodiments of the system and process described herein include stage-type extractors or differential extractors.

Figure 3:
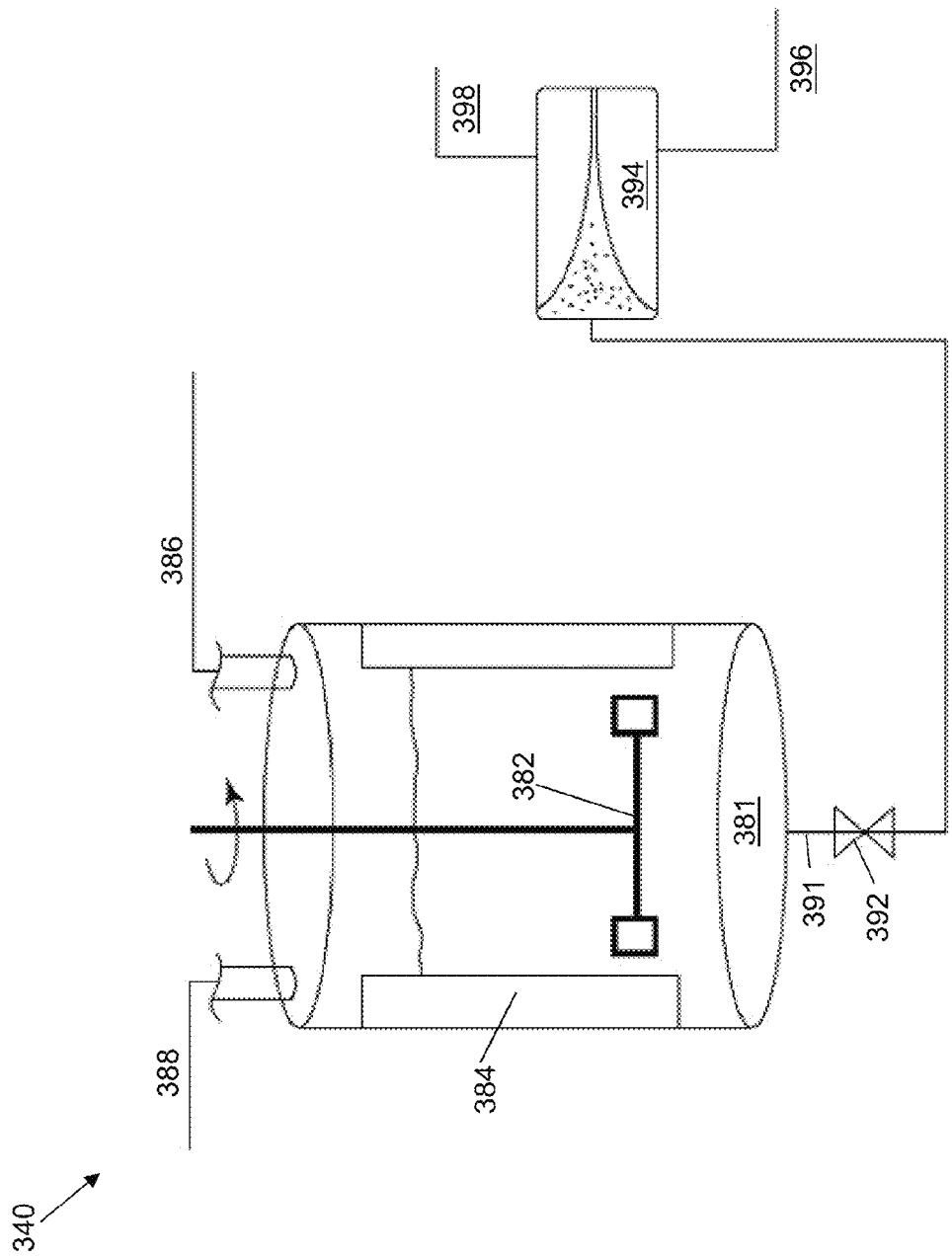
FIGS. 3-8 show various examples of apparatus suitable for use as the aromatic extraction zone.

An example of a stage-type extractor is a mixer-settler apparatus 340 schematically illustrated in FIG. 3. Mixer-settler apparatus 340 includes a vertical tank 381 incorporating a turbine or a propeller agitator 382 and one or more baffles 384. Charging inlets 386, 388 are located at the top of tank 381 and outlet 391 is located at the bottom of tank 381. The feedstock to be extracted is charged into vessel 381 via inlet 386 and a suitable quantity of solvent is added via inlet 388. The agitator 382 is activated for a period of time sufficient to cause intimate mixing of the solvent and charge stock, and at the conclusion of a mixing cycle, agitation is halted and, by control of a valve 392, at least a portion of the contents are discharged and passed to a settler 394. The phases separate in the settler 394 and a raffinate phase containing an aromatic-lean hydrocarbon mixture and an extract phase containing an aromatic-rich mixture are withdrawn via outlets 396 and 398, respectively. In general, a mixer-settler apparatus can be used in batch mode, or a plurality of mixer-settler apparatus can be staged to operate in a continuous mode.

Another stage-type extractor is a centrifugal contactor. Centrifugal contactors are high-speed, rotary machines characterized by relatively low residence time. The number of stages in a centrifugal device is usually one, however, centrifugal contactors with multiple stages can also be used. Centrifugal contactors utilize mechanical devices to agitate the mixture to increase the interfacial area and decrease the mass transfer resistance.

Various types of differential extractors (also known as "continuous contact extractors,") that are also suitable for use as an aromatic extraction apparatus include, but are not limited to, centrifugal contactors and contacting columns such as tray columns, spray columns, packed towers, rotating disc contactors and pulse columns.

Contacting columns are suitable for various liquid-liquid extraction operations. Packing, trays, spray or other droplet-formation mechanisms or other apparatus are used to increase the surface area in which the two liquid phases (i.e., a solvent phase and a hydrocarbon phase) contact, which also increases the effective length of the flow path. In column extractors, the phase with the lower viscosity is typically selected as the continuous phase, which, in the case of an aromatic extraction apparatus, is the solvent phase. In certain embodiments, the phase with the higher flow rate can be dispersed to create more interfacial area and turbulence. This is accomplished by selecting an appropriate material of construction with the desired wetting characteristics. In general, aqueous phases wet metal surfaces and organic phases wet non-metallic surfaces. Changes in flows and physical properties along the length of an extractor can also be considered in selecting the type of extractor and/or the specific configuration, materials or construction, and packing material type and characteristics (i.e., average particle size, shape, density, surface area, and the like).

Figure 4:
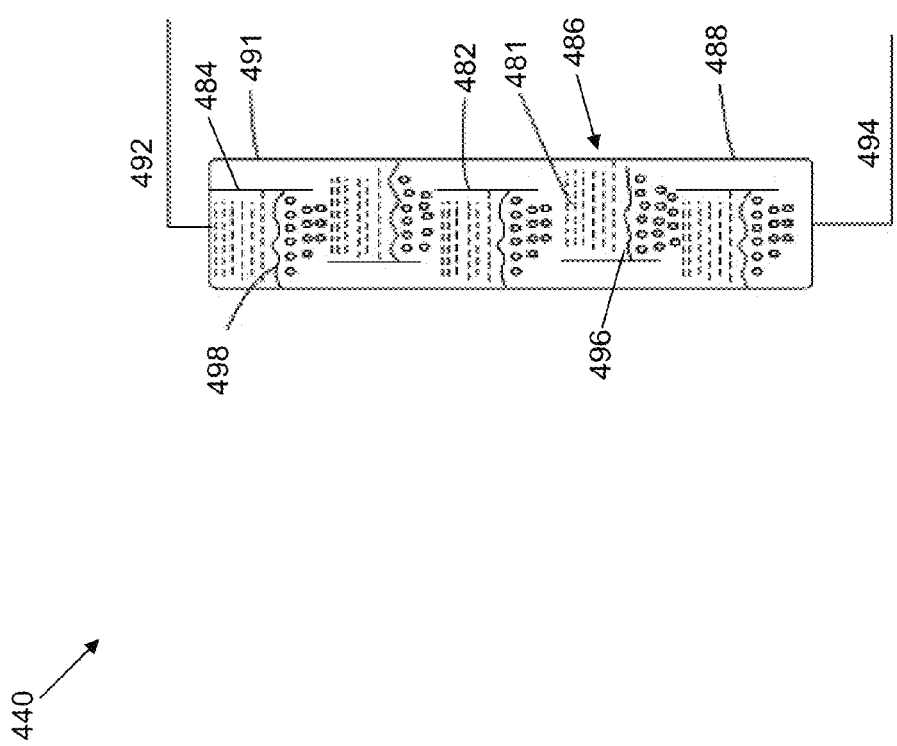

A tray column 440 is schematically illustrated in FIG. 4. A light liquid inlet 488 at the bottom of column 440 receives liquid hydrocarbon, and a heavy liquid inlet 491 at the top of column 440 receives liquid solvent. Column 440 includes a plurality of trays 481 and associated downcomers 482. A top level baffle 484 physically separates incoming solvent from the liquid hydrocarbon that has been subjected to prior extraction stages in the column 440. Tray column 440 is a multi-stage counter-current contactor. Axial mixing of the continuous solvent phase occurs at region 486 between trays 481, and dispersion occurs at each tray 481 resulting in effective mass transfer of solute into the solvent phase. Trays 481 can be sieve plates having perforations ranging from about 1.5 to 4.5 mm in diameter and can be spaced apart by about 150-600 mm.

Light hydrocarbon liquid passes through the perforation in each tray 481 and emerges in the form of fine droplets. The fine hydrocarbon droplets rise through the continuous solvent phase and coalesce into an interface layer 496 and are again dispersed through the tray 481 above. Solvent passes across each plate and flows downward from tray 481 above to the tray 481 below via downcomer 482. The principal interface 498 is maintained at the top of column 440. Aromatic-lean hydrocarbon liquid is removed from outlet 492 at the top of column 440 and aromatic-rich solvent liquid is discharged through outlet 494 at the bottom of column 440. Tray columns are efficient solvent transfer apparatus and have desirable liquid handling capacity and extraction efficiency, particularly for systems of low-interfacial tension.

Figure 5:
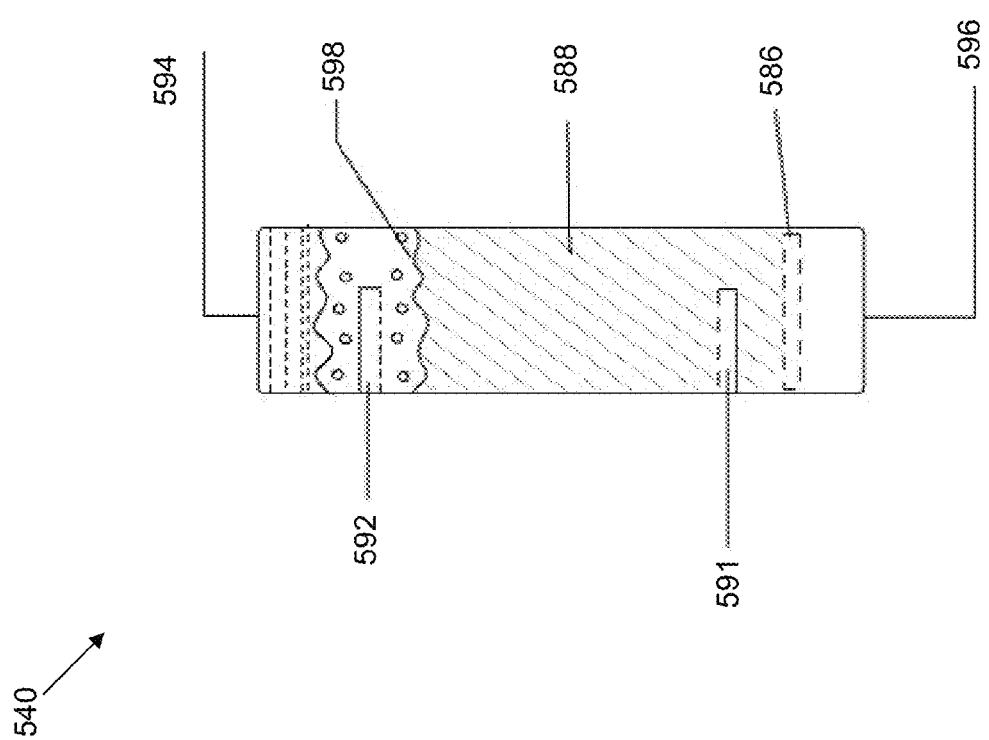

An additional type of unit operation suitable for extracting aromatics from the hydrocarbon feed is a packed bed column. FIG. 5 is a schematic illustration of a packed bed column 540 having a hydrocarbon inlet 591 and a solvent inlet 592. A packing region 588 is provided upon a support plate 586. Packing region 588 comprises suitable packing material including, but not limited to, Pall rings, Raschig rings, Kascade rings, Intalox saddles, Berl saddles, super Intalox saddles, super Berl saddles, Demister pads, mist eliminators, telerrettes, carbon graphite random packing, other types of saddles, and the like, including combinations of one or more of these packing materials. The packing material is selected so that it is fully wetted by the continuous solvent phase. The solvent introduced via inlet 592 at a level above the top of the packing region 588 flows downward and wets the packing material and fills a large portion of void space in the packing region 588. Remaining void space is filled with droplets of the hydrocarbon liquid which rise through the continuous solvent phase and coalesce to form the liquid-liquid interface 598 at the top of the packed bed column 540. Aromatic-lean hydrocarbon liquid is removed from outlet 594 at the top of column 540 and aromatic-rich solvent liquid is discharged through outlet 596 at the bottom of column 540. Packing material provides large interfacial areas for phase contacting, causing the droplets to coalesce and reform. The mass transfer rate in packed towers can be relatively high because the packing material lowers the recirculation of the continuous phase.

Figure 6:
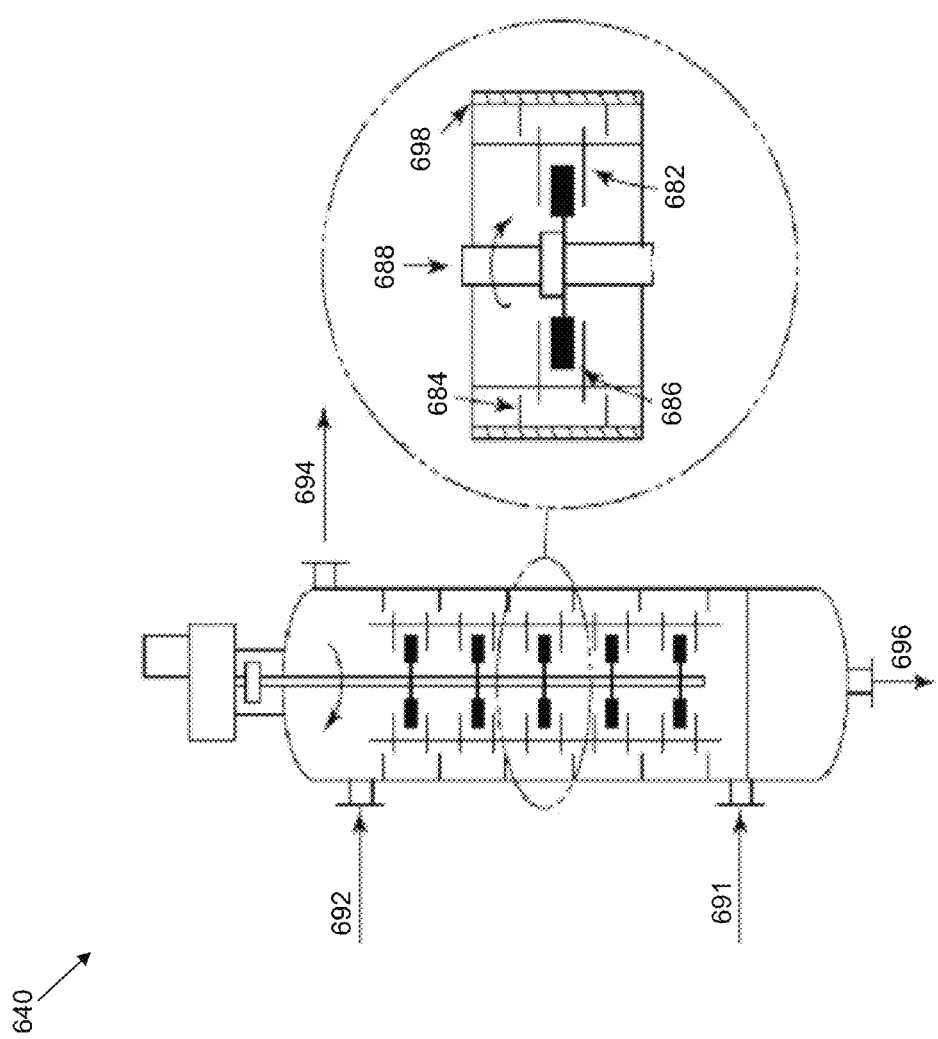

Further types of apparatus suitable for aromatic extraction in the system and method herein include rotating disc contactors. FIG. 6 is a schematic illustration of a rotating disc contactor 640 known as a Scheiebel® column commercially available from Koch Modular Process Systems, LLC of Paramus, N.J., USA. It will be appreciated by those of ordinary skill in the art that other types of rotating disc contactors can be implemented as an aromatic extraction unit included in the system and method herein, including but not limited to Oldshue-Rushton columns, and Kuhni extractors. The rotating disc contactor is a mechanically agitated, counter-current extractor. Agitation is provided by a rotating disc mechanism, which typically runs at much higher speeds than a turbine type impeller as described with respect to FIG. 3.

Rotating disc contactor 640 includes a hydrocarbon inlet 691 toward the bottom of the column and a solvent inlet 692 proximate the top of the column, and is divided into number of compartments formed by a series of inner stator rings 682 and outer stator rings 684. Each compartment contains a centrally located, horizontal rotor disc 686 connected to a rotating shaft 688 that creates a high degree of turbulence inside the column. The diameter of the rotor disc 686 is slightly less than the opening in the inner stator rings 682. Typically, the disc diameter is 33-66% of the column diameter. The disc disperses the liquid and forces it outward toward the vessel wall 698 where the outer stator rings 684 create quiet zones where the two phases can separate. Aromatic-lean hydrocarbon liquid is removed from outlet 694 at the top of column 640 and aromatic-rich solvent liquid is discharged through outlet 696 at the bottom of column 640. Rotating disc contactors advantageously provide relatively high efficiency and capacity and have relatively low operating costs.

Figures 7, 8:
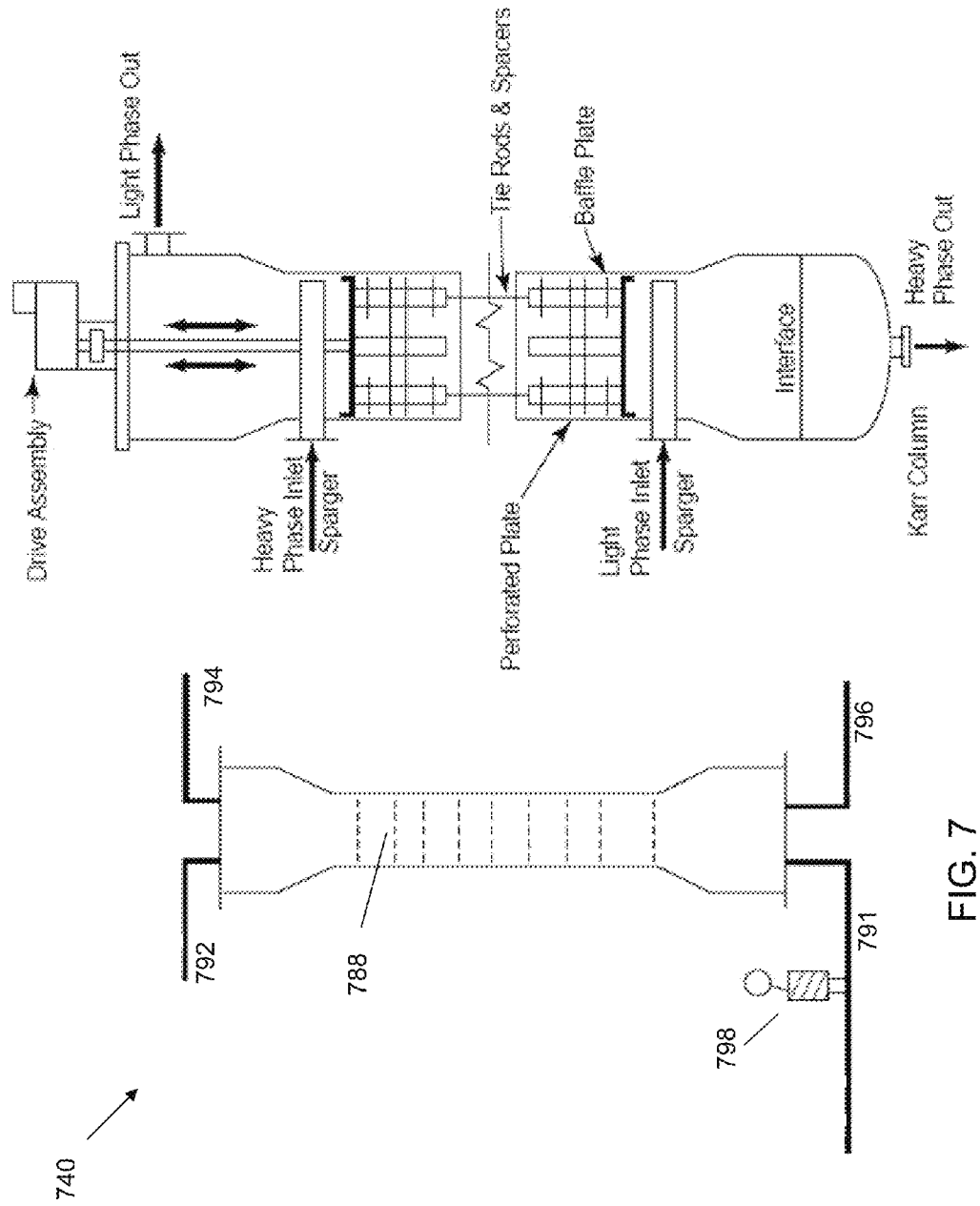

An additional type of apparatus suitable for aromatic extraction in the system and method herein is a pulse column. FIG. 7 is a schematic illustration of a pulse column system 740, which includes a column with a plurality of packing or sieve plates 788, a light phase, i.e., solvent, inlet 791, a heavy phase, i.e., hydrocarbon feed, inlet 792, a light phase outlet 794 and a heavy phase outlet 796.

In general, pulse column system 740 is a vertical column with a large number of sieve plates 788 lacking down comers. The perforations in the sieve plates 788 typically are smaller than those of non-pulsating columns, e.g., about 1.5 mm to 3.0 mm in diameter.

A pulse-producing device 798, such as a reciprocating pump, pulses the contents of the column at frequent intervals. The rapid reciprocating motion, of relatively small amplitude, is superimposed on the usual flow of the liquid phases. Bellows or diaphragms formed of coated steel (e.g., coated with polytetrafluoroethylene), or any other reciprocating, pulsating mechanism can be used. A pulse amplitude of 5-25 mm is generally recommended with a frequency of 100-260 cycles per minute. The pulsation causes the light liquid (solvent) to be dispersed into the heavy phase (oil) on the upward stroke and heavy liquid phase to jet into the light phase on the downward stroke. The column has no moving parts, low axial mixing, and high extraction efficiency.

A pulse column typically requires less than a third the number of theoretical stages as compared to a non-pulsating column. A specific type of reciprocating mechanism is used in a Karr Column which is shown in FIG. 8.

Distinct advantages are offered by the selective hydrocracking apparatus and processes described herein when compared to conventional processes for hydrocracking selected fractions. Aromatics across a full range of boiling points contained in heavy hydrocarbons are extracted and separately processed in hydroprocessing reaction zone operating under conditions optimized for hydrotreating and/or hydrocracking aromatics, including aromatic nitrogen compounds that are prone to deactivate the hydrotreating catalyst.

According to the present processes and apparatus, the overall middle distillate yield is improved as the initial feedstock is separated into aromatic-rich and aromatic-lean fractions and hydrotreated and/or hydrocracked in different hydroprocesing reaction zones operating under conditions optimized for each fraction.

EXAMPLE

A sample of vacuum gas oil (VGO) derived from Arab light crude oil was extracted in an extractor. Furfural was used as the extractive solvent. The extractor was operated at 60° C., atmospheric pressure, and at a solvent to diesel ratio of 1.1:1.0. Two fractions were obtained: an aromatic-rich fraction and an aromatic-lean fraction. The aromatic-lean fraction yield was 52.7 W % and contained 0.43 W % of sulfur and 5 W % of aromatics. The aromatic-rich fraction yield was 47.3 W % and contained 95 W % of aromatics and 2.3 W % of sulfur. The properties of the VGO, aromatic-rich fraction and aromatic-lean fraction are given in Table 1.

TABLE 1

Properties of VGO and its Fractions

| Property | | VGO | VGO-Aromatic-Rich | VGO-Aromatic-Lean |
| --- | --- | --- | --- | --- |
| Density at 15° C. | Kg/L | 0.922 | 1.020 | 0.835 |
| Carbon | W % | 85.27 | | |
| Hydrogen | W % | 12.05 | | |
| Sulfur | W % | 2.7 | 2.30 | 0.43 |
| Nitrogen | ppmw | 615 | 584 | 31 |
| MCR | W % | 0.13 | | |
| Aromatics | W % | 47.3 | 44.9 | 2.4 |
| N + P | W % | 52.7 | 2.6 | 50.1 |

The aromatic-rich fraction was hydrotreated in a fixed-bed hydrotreating unit containing Ni—Mo on silica alumina as hydrotreating catalyst at 150 Kg/cm$^2$ hydrogen partial pressure, 400° C., liquid hourly space velocity of 1.0 h$^{-1}$ and a hydrogen feed rate of 1,000 SLt/Lt. The Ni—Mo on alumina catalyst was used to desulfurize and denitrogenize the aromatic-rich fraction, which includes a significant amount of the nitrogen content originally contained in the feedstock.

The aromatic-lean fraction was hydrotreated in a fixed-bed hydrotreating unit containing Ni—Mo on silica alumina as hydrotreating catalyst at 70 Kg/cm$^2$ hydrogen partial pressure, 370° C., liquid hourly space velocity of 1.0 h$^{-1}$ and a hydrogen feed rate of 1,000 SLt/Lt. The Ni—Mo on alumina catalyst was used to desulfurize and denitrogenize the aromatic lean fraction.

The total reactor effluents from the first stage reactors were combined and sent to the second stage reactor for further cracking of the unconverted bottoms. The second stage reactor contained a zeolitic hydrocracking base catalyst designed for nitrogen containing compounds (Ni—Mo on USY Ti—Zr inserted zeolite catalyst) at 120

Kg/cm² hydrogen partial pressure, 380° C., and a liquid hourly space velocity of 1.5 h⁻¹. No additional hydrogen was added to the second stage as the hydrogen coming from the first stage reactor is sufficient.

The once-thru conversion in the second reactor was 70 W % and no unconverted bottoms were recycled back to the fractionator. The product yields resulting from the each hydroprocesser and the integrated process are given in Table 2:

TABLE 2

Product Yields

| Property | 1st Stage VGO-Aromatic Rich | 1st Stage VGO-Aromatic Lean | 1$^{st}$ & 2$^{nd}$ Stages Overall |
|---|---|---|---|
| Stream # | 154 | 164 | 184 |
| Hydrogen | 2.39 | 1.35 | 4.68 |
| H$_2$S | 2.42 | 0.45 | 1.38 |
| NH$_3$ | 0.07 | 0.00 | 0.04 |
| C$_1$-C$_4$ | 2.78 | 0.32 | 4.09 |
| Naphtha | 19.08 | 1.91 | 39.59 |
| Mid Distillates | 38.04 | 13.67 | 56.56 |
| Unconverted Bottoms | 40.00 | 85.00 | 19.11 |
| Total | 102.39 | 101.35 | 120.77 |

The method and system herein have been described above and in the attached drawings; however, modifications will be apparent to those of ordinary skill in the art and the scope of protection for the invention is to be defined by the claims that follow.

What is claimed is:

1. An integrated apparatus for processing heavy hydrocarbon feedstocks to produce clean transportation fuels comprising:
   an aromatic separation zone operable to extract aromatic compounds from the hydrocarbon feedstock, the aromatic separation zone including an inlet for receiving the hydrocarbon feedstock, an aromatic-rich outlet and an aromatic-lean outlet;
   a series-flow hydroprocessing reaction zone having a first stage hydroprocessing reaction zone and a second stage hydroprocessing reaction zone, the series-flow hydroprocessing reaction zone including
      the first vessel of a first stage hydroprocessing reaction zone having an inlet in fluid communication with the aromatic-rich outlet and an outlet for discharging first vessel first stage hydroprocessing reaction zone effluent,
      a second vessel of the first stage hydroprocessing reaction zone having an inlet in fluid communication with the aromatic-lean outlet, and an outlet for discharging second vessel first stage hydroprocessing reaction zone effluent, and
      the second stage hydroprocessing reaction zone having an inlet in fluid communication with both the first vessel first stage hydroprocessing reaction zone effluent and the second vessel first stage hydroprocessing reaction zone effluent, and an outlet for discharging second stage hydroprocessing reaction zone effluent; and
   a fractionating zone having an inlet in fluid communication with the second stage hydroprocessing reaction zone effluent, one or more outlets for discharging product and one or more outlets for discharging bottoms.

2. The system of claim 1, wherein the aromatic separation zone includes a mixer-settler apparatus.

3. The system of claim 1, wherein the aromatic separation zone includes a centrifugal contactor.

4. The system of claim 1, wherein the aromatic separation zone includes a contacting column.

5. The system of claim 4, wherein the contacting column is a tray column.

6. The system of claim 4, wherein the contacting column is a packed bed column.

7. The system of claim 4, wherein the contacting column is a rotating disc contactor.

8. The system of claim 4, wherein the contacting column is a pulse column.

* * * * *